United States Patent [19]

Chen et al.

[11] Patent Number: 5,135,334
[45] Date of Patent: Aug. 4, 1992

[54] METHOD AND APPARATUS OF WATER-SAVING IRRIGATION SYSTEM

[76] Inventors: Haw-Renn Chen; Feichu H. Chen, both of 4057 Little Hollow Pl., Moorpark, Calif. 93021

[21] Appl. No.: 660,178

[22] Filed: Feb. 25, 1991

[51] Int. Cl.⁵ .............................................. E02B 13/00
[52] U.S. Cl. ........................................ 405/48; 405/43; 405/45
[58] Field of Search ....................... 405/43, 45, 44, 47, 405/48, 49; 239/145, 547

[56] References Cited

U.S. PATENT DOCUMENTS

| | | | |
|---|---|---|---|
| 901,582 | 10/1908 | Austin | 405/43 |
| 1,052,121 | 2/1913 | Austin | 405/44 |
| 2,798,768 | 7/1957 | Babin | 405/45 X |
| 3,528,251 | 9/1970 | Falk | 405/43 |
| 3,552,654 | 1/1971 | Thomas | 405/43 X |
| 4,061,272 | 12/1977 | Winston | 239/145 X |

FOREIGN PATENT DOCUMENTS

| | | | |
|---|---|---|---|
| 1041777 | 11/1978 | Canada | 405/43 |
| 2304281 | 10/1976 | France | 405/43 |
| 2194123 | 3/1988 | United Kingdom | 405/43 |

Primary Examiner—Dennis L. Taylor

[57] ABSTRACT

A method of providing an efficient underground irrigation means is introduced to deliver the irrigation liquid from a supply or supplies through an underground irrigation means to the areas to be irrigated without sending the irrigation liquid above the ground. This underground irrigation means comprises a control means and an irrigation liquid distribution means. The control means is used to control the speed, timing, or pressure of the irrigation liguid flow to accomplish the optimal irrigation results. The irrigation liquid distribution means transfer the irrigation liquid from supplies through the control means to irrigation liquid conducting means and, then, from the irrigation liquid conducting means to the diffusion irrigation means. The diffusion irrigation means, being appropriately laid out in the area to be irrigated, disperses the irrigation liquid over the areas to be irrigated.

2 Claims, 1 Drawing Sheet

METHOD AND APPARATUS OF WATER-SAVING IRRIGATION SYSTEM

This application is a continuation of U.S. patent application Ser. No. 07/471,433, filed Jan. 29, 1990, now abandoned.

BACKGROUND OF THE INVENTION

Three types of conventional irrigation systems are currently available. They are the portable irrigation system, the semi-permanent above-ground drip irrigation system, and the permanent underground sprinkler system. The portable irrigation system is basically a garden hose with a hose end sprinkler. The semi-permanent above-ground drip irrigation system is a low pressure, low flow water irrigation system which uses emitters or minisprinklers to irrigate localized subject such as a plant etc. The sprinkler system is a high-pressure, high-flow water-delivery means which delivers water from water pipes into the air through sprinkling heads by means of the water pressure in the water pipes. The sprinkled water drops then drop over the area around the sprinkling heads to wet the soil. The sprinkler system is the most popularly used conventional irrigation system at present time.

Due to the fact that the conventional irrigation system waters an area by pouring water drops or streams to the ground surface, significant amount of the irrigation water gets wasted just by running off, especially for a sloping area where almost all the distributed water gets wasted due to runoff. Evaporation also contributes some water waste for the conventional irrigation system. This ineffectiveness of the irrigation by the conventional irrigation systems consumes much of the useful water resources which should have been used for other crucial purposes otherwise. Consequently, the water resources are seriously exhausted over widespread regions, such as California, etc., such that even the environments get impacted. For instance, the water level of the Mono Lake in North California is getting lower day by day simply because people need more water for use in other areas, in which usually a significant portion of water is wasted through the conventional irrigation systems, such that the water sources of the Mono Lake are cut off and moved to be used by the people.

Other than the serious problem of water waste through the conventional irrigation systems, there are some other disadvantages over the use of the conventional irrigation system. First of all, in order to have the water sprinkled properly, sprinkler heads are installed extending above the ground surface so that the sprinkler heads not only affect the look of the garden or yard but also are susceptible to foot traffic or gardening equipment. Secondly, the conventional irrigation systems make the lawn or the ground wet letting the lawn or the ground unenjoyable by people. Thirdly, the sprinkled water streams from the sprinkler heads may be obstructed by nearby grass or other foreign objects so that the irrigation function over the areas along the direction of the blocked water streams is lost. Fourthly, the sprinkled water amount is highly direction dependant and is unpredictable, especially at the windy areas where wind blow will carry away the sprinkled water drops. Lastly, the water distribution over the irrigated areas is highly depending upon the flatness of the ground surface. Consequently, the setup and the way of distributing water by means of the conventional irrigation systems are not effective, not economical, and not neat.

Hence, there are urgent needs to have the irrigation means other than the conventional irrigation systems to overcome the serious water wasting problems as well as environment impact problems, which are partially, significantly, and particularly caused by the water wasting through the current sprinkler irrigation means.

OBJECTS AND ADVANTAGES OF THE INVENTION

Accordingly, the present invention is used to solve the problems of unneatness, uneconomy, and ineffectiveness caused by the conventional irrigation systems. There are variety of advantages by utilizing the present invention over currently available irrigation systems as follows:

1) The most important one is that the irrigation liquid is not going to be accumulated over the ground surface through the uses of the present invention as the irrigation means so that significant amount of the water utilized by people can be saved by eliminating the amount of water wasted by running off. The saving on the irrigation water can be particularly significant for a slope, a slant, or any curved areas where most of water gets wasted if the conventional irrigation means are used. As water is significantly saved through the use of the present invention, a the great deal amount of water can be kept in the original paths on earth such that the environment impact due to the water exhausted by people can be minimized.

2) The present invention doesn't have the sprinkler heads or the like to distribute the irrigation liquid over the ground surface so that the installation of the present invention is not harmful or susceptible to foot traffic or equipment movement.

3) The present invention irrigates the irrigated soil from underground by diffusion mechanism so that it will keep the ground surface dry to have the ground surface enjoyable.

4) The irrigation liquid distributed through the present invention is much more uniform, even, and thorough regardless the conditions of the ground surface, the air flow conditions above the ground surface, etc.

Therefore, the primary object of the present invention is to provide people with efficient and economical irrigation means in order to save the water resources as well as to reduce people's water bill. The other object of the present invention is to provide people with an irrigation means to replace the currently available irrigation systems such that the ground surface is no longer wet due to irrigation, the sprinkler head extrusion is no longer existing in a garden to be harmful or vulnerable, the irrigation is no longer unpredictable due to wind blow or obstacle objects around the sprinkler heads. As a result, the present invention can provide people with a more enjoyable, more economical, and more efficient irrigation system.

BRIEF DESCRIPTION OF THE INVENTION

DESCRIPTION OF THE EMBODIMENT AND OPERATION

A method of effectively irrigating by means of an underground irrigation means is provided in the present invention—the water-saving irrigation means. The water-saving irrigation means comprises an irrigation control means and an irrigation liquid distribution means to perform the irrigation function. As part of the underground irrigation means, the irrigation liquid distribution means is mostly installed below the ground surface.

Figure 1:
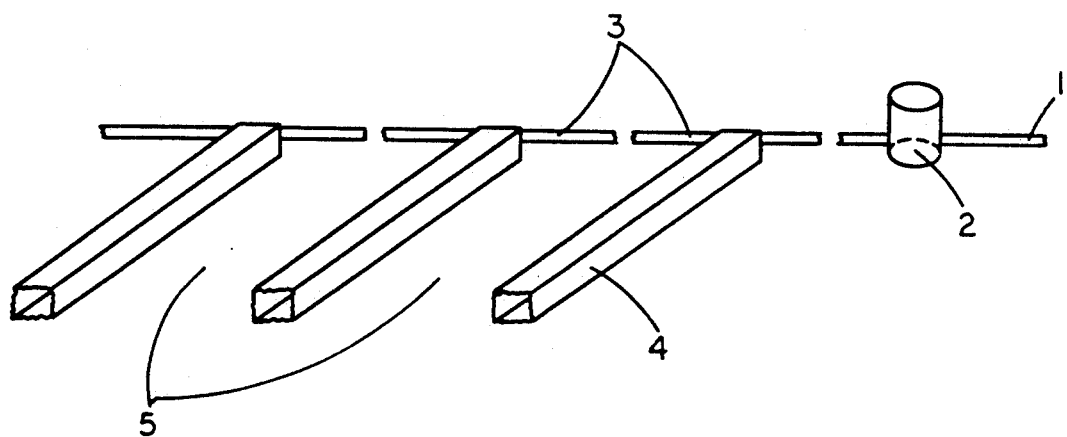
FIG. 1 illustrates the birdview of the layout of the water-saving irrigation system.

FIG. 1 shows the birdview of the layout of a water-saving irrigation system. As illustrated in FIG. 1, the irrigation control means comprises the control means 2 while the irrigation liquid distribution means comprises the irrigation liquid supply means 1, the irrigation liquid conducting means 3, and the diffusion irrigation means 4. The control means 2 can adjust the irrigation wetness by controlling the irrigation timings, the irrigation liquid flow, the irrigation liquid pressure, etc. The irrigation liquid supply means 1 is a resource of the irrigation liquid. The irrigation liquid conducting means 3 is used to deliver the irrigation liquid from the irrigation liquid supply means 1 to the area to be irrigated, 5. The diffusion irrigation means 4 is preferably made to be transversely flexible so that the diffusion irrigation means 4 can be transversely bent to be laid out in any winding pattern to fit the surface topology over the area to be irrigated and to properly minimize the number of the diffusion irrigation means 4 as the branches of and from the irrigation liquid conducting means 3 over the area to be irrigated. The diffusion irrigation means 4 can also be wound to surround particular objects, such as plants or bushes, for achieving optimal irrigation results. Also, the diffusion irrigation means 4 is to be configured with sufficient rigidity along the cross sectional planes such that the cross sections of the diffusion irrigation means 4 can be kept from being deformed under the pressure of the surrounding soil.

Figure 2A:
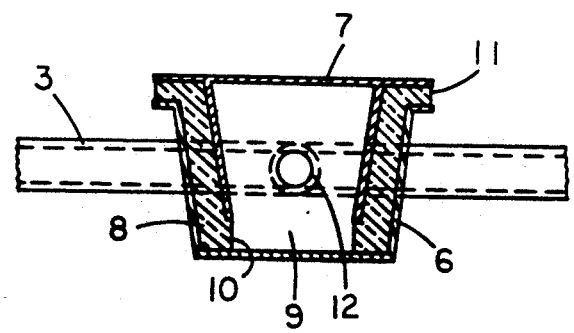
FIG. 2A illustrates the cross-sectional view of the diffusion irrigation means.
Figure 2B:
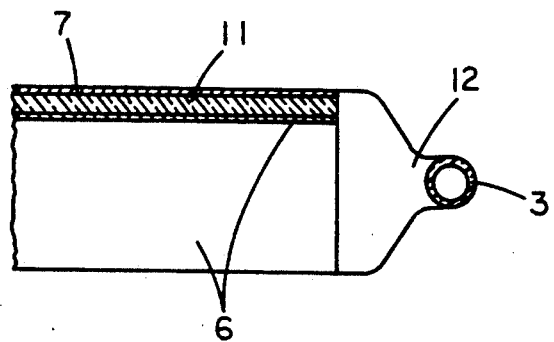
FIG. 2B illustrates the side view of the diffusion irrigation means.

The cross sectional view of the diffusion irrigation means 4 is shown in FIG. 2A while the side view of the diffusion irrigation means 4 is shown in FIG. 2B. As can be seen in FIG. 2A, the diffusion irrigation means 4 comprises a liquid containing means which includes a lower containing means 6, having a bottom with upwardly and outwardly sloping legs, and an upper containing means, having a top surface with downwardly and inwardly sloping legs, with a number of connection mechanisms keeping the lower containing means and the upper containing means in unity, the diffusion transporting means 8 forming an appropriate width of channel between the downwardly and inwardly sloping legs of the upper containing means 7 the upwardly and outwardly sloping legs of the lower containing means 6 filled with liquid diffusing material having physical properties of allowing irrigation liquid to diffuse thereof by the effects of diffusion and pressure gradient, and liquid containing chamber 9. Irrigation liquid inlets 10 are formed at one end of the diffusion transporting means 8, preferably at the bottom of the irrigation liquid containing chamber 9, while irrigation liquid outlets 11 are formed at the other side of the diffusion transporting means 8, preferably at the upper corner of the liquid containing means. As shown in FIG. 2B, the diffusion irrigation means 4 is connected to the irrigation liquid conducting means 3 through the irrigation liquid dispatch means 12.

The irrigation liquid from the irrigation liquid supply means 1 goes to the irrigation liquid conducting means 3 through the control means 2 and, then, goes from the irrigation liquid conducting means 3 to the diffusion irrigation means 4 through the irrigation liquid dispatch means 12. The lower containing means 6 associating with the upper containing means 7 are used to enclose the irrigation liquid and to retain the pressure of the irrigation liquid. As soon as the irrigation liquid goes to the diffusion irrigation means 4, the irrigation liquid will transport along the diffusion transporting means 8 by means of diffusion and pressure gradient from the irrigation liquid inlet 10 to the irrigation liquid outlet 11, and then from the irrigation liquid outlet 11 to irrigate the surrounding area 5. The irrigation liquid flow from the irrigation liquid inlet 10 to the irrigation liquid outlet 11 is not only determined by the configuration and material of the diffusion transporting means 8, but also controlled by the irrigation liquid pressure in the liquid containing chamber 9.

The present invention is highly effective on irrigating a slope, a slant, or any other types of ramped or curved ground surface. Based on the configuration illustrated in FIG. 1, the optimal irrigation efficiency can be obtained if the diffusion irrigation means 4 are placed in parallel to the contour lines of a slope, or any curved ground surface in which, with the gravity force as well as the diffusion force, the irrigation liquid can be uniformly and evenly distributed over the sloping or curved areas.

CONCLUSION, RAMIFICATIONS, AND SCOPE

Accordingly, it can be seen that the water-saving irrigation means of the present invention can be used to irrigate an area or region without sending the water over the ground surface. Since the irrigating water will not be wasted just by running off from the ground surface, a great deal amount of water can be saved through the water-saving irrigation means of the present invention. This water saving can have the irrigation more efficient, can let people reduce their water bill, and can have the environments be less impacted due to water outflown from the nature to be used by people. Furthermore, the water-saving irrigation means has the additional advantages in that it is highly efficiency on irrigating a sloping area, curving areas, or the like, the loss of irrigation liquid through evaporation is less than the conventional irrigation systems.

Although the above detail description contains many specifications, these should not be construed as limiting the scope of the invention but as merely providing illustrations of some of the presently preferred embodiments of this invention. For example, the shape of the diffusion irrigation means can be designed to be different; the irrigation liquid dispatch means can be designed in different ways, etc.

Thus the scope of the invention should be determined by the appended claims and their legal equivalents, rather than by the examples given.

We claim:

1. A diffusion irrigation means comprising upper containing means having a top surface with downwardly and inwardly sloping legs, lower containing means having a bottom surface with upwardly and outwardly sloping legs, and a diffusion transporting means between said downwardly and inwardly sloping legs of said upper containing means and said upwardly and outwardly sloping legs of said lower containing means thereby said upper containing means and said lower containing means form a liquid containing chamber for containing irrigation liquid therein, said irrigation liquid being transported form said liquid containing chamber to soil surrounding said diffusion irrigation means through said diffusion transporting means by diffusion material located in said diffusion transporting means.

2. A diffusion irrigation means as set forth in claim 1 wherein said diffusion irrigation means is flexible.

* * * * *